United States Patent
Yue et al.

(10) Patent No.: US 10,869,358 B2
(45) Date of Patent: Dec. 15, 2020

(54) CONFIGURATION METHOD OF DISCOUNTINUOUS RECEPTION PARAMETER, MOBILE TERMINAL, AND BASE STATION

(71) Applicant: VIVO MOBILE COMMUNICATION CO., LTD., Chang'an DongGuan (CN)

(72) Inventors: Ran Yue, Chang'an DongGuan (CN); Yu Ding, Chang'an DongGuan (CN); Fei Qin, Chang'an DongGuan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/347,078

(22) PCT Filed: Oct. 31, 2017

(86) PCT No.: PCT/CN2017/108594
§ 371 (c)(1),
(2) Date: May 2, 2019

(87) PCT Pub. No.: WO2018/082542
PCT Pub. Date: May 11, 2018

(65) Prior Publication Data
US 2019/0274184 A1    Sep. 5, 2019

(30) Foreign Application Priority Data
Nov. 4, 2016 (CN) .......................... 2016 1 0963587

(51) Int. Cl.
*H04W 76/28* (2018.01)
*H04W 76/27* (2018.01)
*H04W 52/02* (2009.01)

(52) U.S. Cl.
CPC .......... *H04W 76/28* (2018.02); *H04W 52/02* (2013.01); *H04W 52/0209* (2013.01);
(Continued)

(58) Field of Classification Search
CPC . H04W 76/28; H04W 52/02; H04W 52/0277; H04W 52/0209; H04W 76/27;
(Continued)

(56) References Cited

U.S. PATENT DOCUMENTS

2004/0127265 A1    7/2004  Van Bosch et al.
2011/0212742 A1*   9/2011  Chen ..................... H04W 76/28
                                                    455/507
(Continued)

FOREIGN PATENT DOCUMENTS

CN    102487541 A    6/2012
CN    103391600 A    11/2013
(Continued)

OTHER PUBLICATIONS

PCT/CN2017/108594—International Search Report dated Jan. 11, 2018, 4 pages.
(Continued)

*Primary Examiner* — Walli Z Butt
(74) *Attorney, Agent, or Firm* — Getech Law LLC; Jun Ye

(57) ABSTRACT

The preset disclosure provides a configuration method of DRX parameter, a mobile terminal, and a base station. The configuration method includes: transmitting, upon detecting that the mobile terminal satisfies a preset DRX parameter modification condition, a DRX parameter modification request message to a base station; receiving a response message corresponding to the DRX parameter modification request message and the response message is transmitted from the base station; and updating a DRX parameter configuration by the mobile terminal according to the response message.

14 Claims, 8 Drawing Sheets

(52) U.S. Cl.
CPC ... *H04W 52/0258* (2013.01); *H04W 52/0261* (2013.01); *H04W 52/0277* (2013.01); *H04W 76/27* (2018.02); *Y02D 30/70* (2020.08)

(58) Field of Classification Search
CPC ......... H04W 52/0258; H04W 52/0261; H04W 52/0216; Y02D 70/00; Y02D 70/20
See application file for complete search history.

(56) References Cited

U.S. PATENT DOCUMENTS

| | | | |
|---|---|---|---|
| 2013/0229931 A1 | 9/2013 | Kim | |
| 2013/0265928 A1* | 10/2013 | Martinez Tarradell | H04L 5/1446 370/312 |
| 2014/0056200 A1* | 2/2014 | Koc | H04L 1/1812 370/311 |
| 2014/0119255 A1* | 5/2014 | Vannithamby | H04W 52/244 370/311 |
| 2015/0023238 A1 | 1/2015 | Fukuta et al. | |
| 2015/0131505 A1 | 5/2015 | Dai | |
| 2015/0365995 A1 | 12/2015 | Tabet et al. | |
| 2017/0318536 A1* | 11/2017 | Manepalli | H04W 52/0245 |

FOREIGN PATENT DOCUMENTS

| | | |
|---|---|---|
| CN | 103428682 A | 12/2013 |
| CN | 103428773 A | 12/2013 |
| CN | 103581886 A | 2/2014 |
| CN | 103874139 A | 6/2014 |
| CN | 103945505 A | 7/2014 |
| CN | 104145509 A | 11/2014 |
| CN | 105530665 A | 4/2016 |
| WO | 2018082542 A1 | 11/2018 |

OTHER PUBLICATIONS

PCT/CN2017108594, Extended European Search Report dated Jul. 29, 2019, 9 pages.
CN201610963587.5—First Office Action dated May 8, 2019, 12 Pages. English Translation 14 pages.
Samsung, "Assistance information from UE to eNB for eDDA", Mar. 26-30, 2012, 4 pages.

* cited by examiner

CONFIGURATION METHOD OF DISCOUNTINUOUS RECEPTION PARAMETER, MOBILE TERMINAL, AND BASE STATION

CROSS-REFERENCE TO RELATED APPLICATION

This application is the U.S. national phase of PCT Application No. PCT/CN2017/108594 filed on Oct. 31, 2017, which claims priority to Chinese Patent Application No. 201610963587.5 filed on Nov. 4, 2016, the disclosures of which are incorporated in their entirety by reference herein.

TECHNICAL FIELD

The present disclosure relates to the field of communication technology, and in particular to a configuration method of discontinuous reception parameter, a mobile terminal and a base state.

BACKGROUND

At present, how to configure Discontinuous Reception (DRX) in the New Radio (NR) system is still uncertain. In the Long Term Evolution (LTE) system which is the baseline of NR DRX discussion, the Radio Resource Control (RRC) layer configures the related timer for the long DRX cycle, or the related timers for both the long DRX cycle and the short DRX cycle. That is, the configuration of up to two kinds of DRX parameters can be realized.

The Media Access Control (MAC) layer implements a conversion from the long DRX cycle to the short DRX cycle by timeout of the DRX-inactivity timer or by the DRX Command MAC control element, and implements a conversion from the short DRX cycle to the long DRX cycle by timeout of the DRX short cycle timer or by the Long DRX Command MAC control element.

The DRX Command MAC control element and the Long DRX command MAC control element are distinguished and indicated to the user by using different indexes of the MAC layer. The specific configuration indications are as shown in Table 1.

TABLE 1

| Index | Indication content |
| --- | --- |
| 11010 | Long DRX Command |
| 11110 | DRX Command |

In the above DRX solution in the related art, the configurations of up to two types of DRX parameters (i.e., the long DRX cycle and the short DRX cycle) are supported for each user, which cannot meet the different requirements of multiple services in the NR system. Therefore, during the discussion of NR, it is mentioned that the DRX parameters is configured according to the services.

However, in the current discussion, the configuration of the DRX parameters is based on the configuration of the base station, and cannot be implemented in combination with the actual requirements of the User Equipment (UE), so that the DRX of the user equipment does not meet the actual requirements.

SUMMARY

An object of the embodiments of the present disclosure is to provide a configuration method of DRX parameter, a mobile terminal and a base station, so as to solve the problem that the configuration of the DRX parameters cannot be implemented in combination with the actual requirements of the user equipment, so that the DRX of the user equipment does not meet the actual requirements.

In a first aspect, the embodiments of the present disclosure provides a configuration method of discontinuous reception (DRX) parameter applied to a mobile terminal, including:

transmitting, upon detecting that the mobile terminal satisfies a preset DRX parameter modification condition, a DRX parameter modification request message to a base station;

receiving a response message corresponding to the DRX parameter modification request message and the response message is transmitted from the base station; and updating a DRX parameter configuration by the mobile terminal according to the response message.

In a second aspect, the embodiments of the present disclosure further provides a mobile terminal including:

a first transmitting module for transmitting a DRX parameter modification request message to a base station when it is detected that the mobile terminal satisfies a preset DRX parameter modification condition;

a first receiving module for receiving a response message corresponding to the DRX parameter modification request message and the response message is transmitted from the base station;

a control module for updating a DRX parameter configuration by the mobile terminal according to the response message.

In a third aspect, the embodiments of the present disclosure further provides a configuration method of DRX parameter applied to a base station, including:

receiving a DRX parameter modification request message transmitted from a mobile terminal;

transmitting a response message to the mobile terminal to make the mobile terminal update a DRX parameter configuration.

In a fourth aspect, the embodiments of the present disclosure further provides a base station including:

a second receiving module for receiving a DRX parameter modification request message transmitted from a mobile terminal;

a second transmitting module for transmitting a response message to the mobile terminal to make the mobile terminal update a DRX parameter configuration.

In a fifth aspect, the embodiments of the present disclosure further provides a mobile terminal including a storage, a processor, and a computer program stored on the storage and executable by a processor, when executing the computer program, the processor performing the steps of the configuration method of DRX parameter applied to a mobile terminal as described above.

In a sixth aspect, the embodiments of the present disclosure further provides a base station including a storage, a processor, and a computer program stored on the storage and executable by a processor, when executing the computer program, the processor performing the steps of the configuration method of DRX parameter applied to a base station as described above.

Thus, in the embodiments of the present disclosure, when it is detected that the mobile terminal satisfies a preset DRX parameter modification condition, a DRX parameter modification request message is transmitted to the base station, and the mobile terminal update the DRX parameter configuration according to the response message returned by the base station, thereby achieving that the DRX parameter configuration is implemented in combination with the actual requirements of the terminal, and the DRX of the terminal can satisfy the actual requirements.

BRIEF DESCRIPTION OF THE DRAWINGS

In order to more clearly illustrate the technical solutions of the embodiments of the present disclosure, the drawings used in the description of the embodiments of the present disclosure will be briefly described below. It is obvious that the drawings in the following description are only some embodiments of the present disclosure. For those skilled in the art, other drawings may be obtained according to these drawings without any inventive labor.

DETAILED DESCRIPTION

The technical solutions in the embodiments of the present disclosure will be described hereinafter clearly and thoroughly in conjunction with the drawings in the embodiments of the present disclosure. It is apparent that the described embodiments are a part of the embodiments of the present disclosure, and not all of them. All other embodiments obtained by a person of ordinary skill in the art based on the embodiments of the present disclosure without inventive efforts are within the protective scope of the present disclosure.

Figure 1:
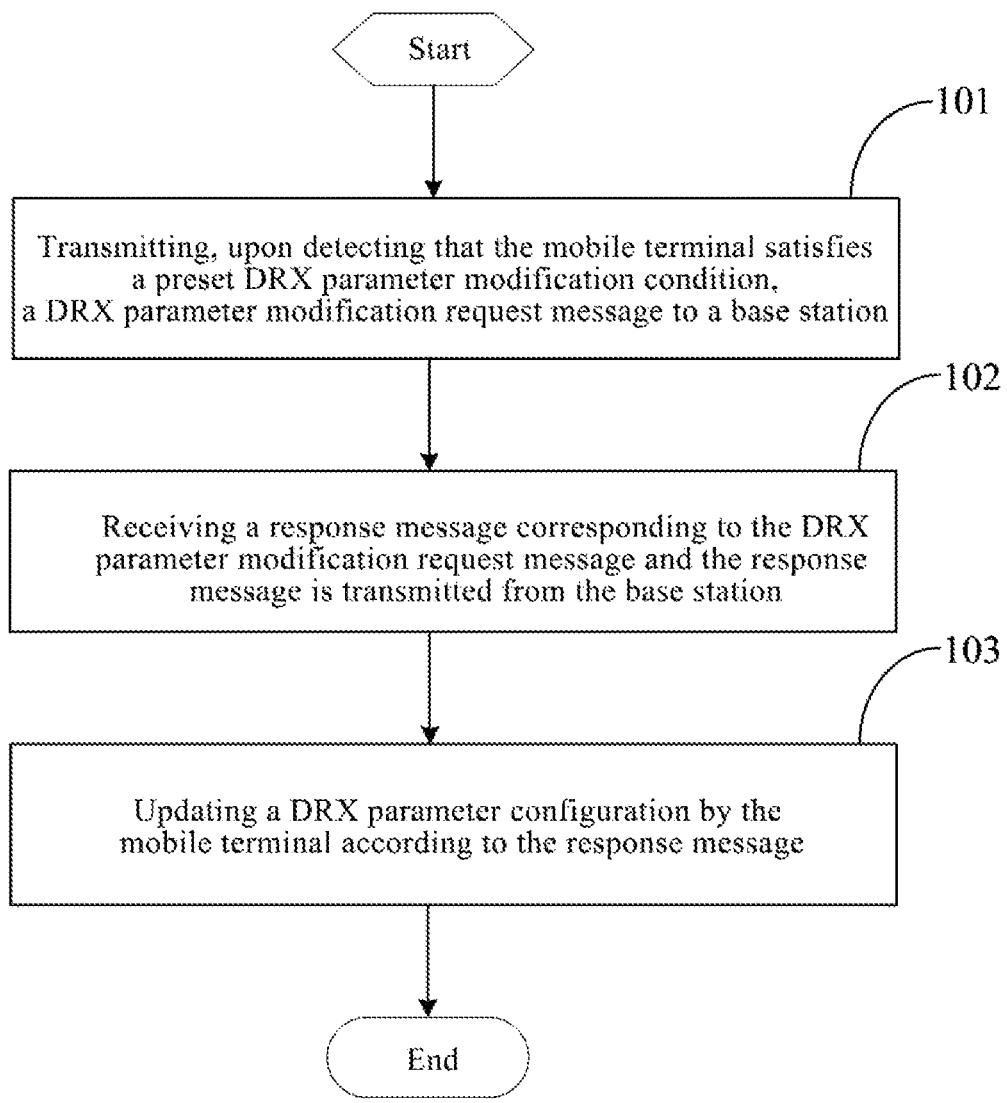
FIG. 1 is a flow chart of a configuration method of DRX parameter in some embodiments of the present disclosure.

As shown in FIG. 1, in some embodiments of the present disclosure, provided is a configuration method of discontinuous reception (DRX) parameter applied to a mobile terminal (e.g., a smartphone, a tablet, etc.). The method includes:

Step 101, transmitting, upon detecting that the mobile terminal satisfies a preset DRX parameter modification condition, a DRX parameter modification request message to a base station.

The above DRX parameter modification request message carries a DRX parameter target value therein so that the DRX parameters of the mobile terminal can be configured subsequently to satisfy the actual requirements of the mobile terminal.

In the above embodiment of the present disclosure, there are three specific implementation manners to detect that the mobile terminal satisfies the preset DRX parameter modification condition. Wherein, the first specific implementation manner is: if it is detected that remaining battery capacity of the mobile terminal is lower than a preset battery capacity, it is determined that the mobile terminal satisfying the preset DRX parameter modification condition is detected; the second specific implementation manner is: if it is detected that an occupancy rate of a central processing unit (CPU) of the mobile terminal is higher than or equal to a preset occupancy rate, it is determined that the mobile terminal satisfying the preset DRX parameter modification condition is detected; the third specific implementation manner is: if it is detected that a temperature of the mobile terminal is higher than or equal to a preset temperature, it is determined that the mobile terminal satisfying the preset DRX parameter modification condition is detected. It should be noted that, in the above embodiment of the present disclosure, the specific values of the preset battery capacity and the preset occupancy rate are not limited.

In the above embodiment of the present disclosure, the mobile terminal actively transmits the DRX parameter modification request message carrying the DRX parameter target value to the base station when it detects that the preset DRX parameter modification condition is satisfied (e.g., when the remaining battery capacity is less than the preset battery capacity), so that the DRX parameter of the mobile terminal can be configured subsequently to satisfy the actual requirements of the mobile terminal.

Step 102, receiving a response message corresponding to the DRX parameter modification request message and the response message is transmitted from the base station.

In the above embodiment of the present disclosure, the response message transmitted from the base station may be received via high layer signaling or a high layer control element so as to update the DRX parameter configuration quickly and accurately at a later time. Wherein the above high layer signaling may be the RRC signaling, and the high layer control element may be the MAC control element.

Step 103, update a DRX parameter configuration by the mobile terminal according to the response message.

Figure 2:
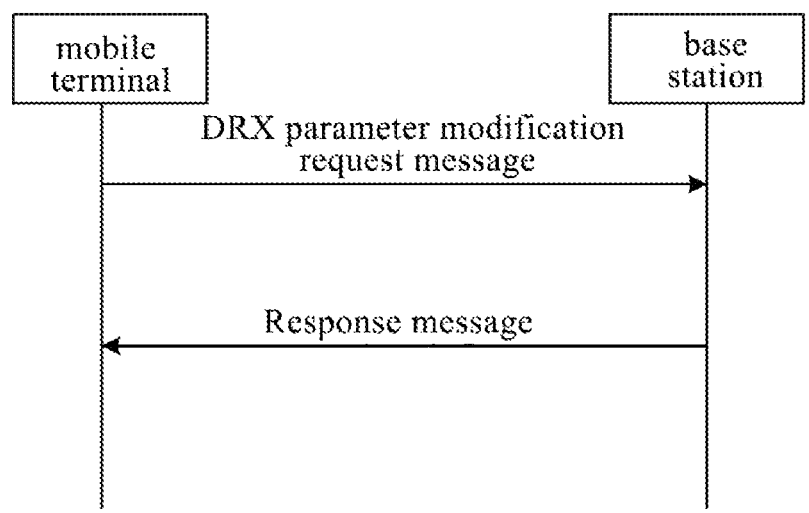
FIG. 2 is a schematic diagram of interaction between a mobile terminal and a base station in some embodiments of the present disclosure.

In the above embodiment of the present disclosure, the interaction process between the mobile terminal and the base station is as shown in FIG. 2. That is, when the mobile terminal detects that it satisfies the preset DRX parameter modification condition, it actively transmits the DRX parameter modification request message to the base station, and the base station may return the response message to the mobile terminal according to the DRX parameter modification request message. When the response message received by the mobile terminal includes a first instruction indicating that the DRX parameter updating of the mobile terminal is confirmed, the mobile terminal may update the DRX parameter configuration in accordance with the DRX parameter target value.

In the above embodiment of the present disclosure, when it is detected that the mobile terminal satisfies the preset DRX parameter modification condition, the DRX parameter modification request message is transmitted to the base station, and the mobile terminal is controlled according to the response message returned by the base station to update the DRX parameter configuration; in this way, it is achieved to implement the DRX parameter configuration in combination with the actual requirements of the terminal, and make the DRX of the terminal satisfy the actual requirements.

Figure 3:
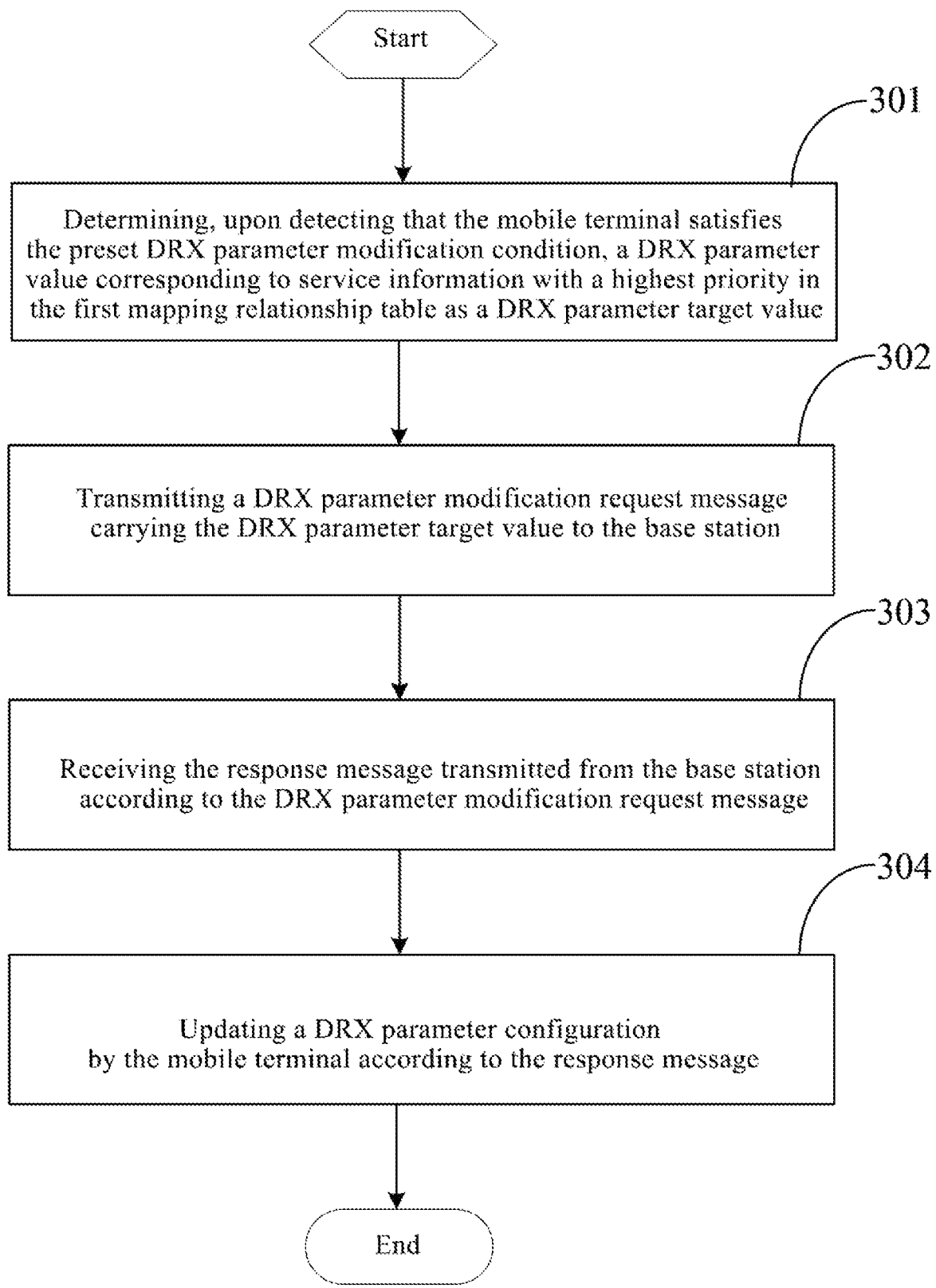
FIG. 3 is a flow chart of a configuration method of DRX parameter in some embodiments of the present disclosure.

As shown in FIG. 3, in some embodiments of the present disclosure, provided is a configuration method of DRX parameter applied to a mobile terminal (e.g., a smartphone, a tablet, etc.). The method includes:

Step 301, when it is detected that the mobile terminal satisfies the preset DRX parameter modification condition, determining a DRX parameter value corresponding to service information with a highest priority in a first mapping relationship table as a DRX parameter target value.

It should be noted that the first mapping relationship table is preset in the above mobile terminal. The first mapping relationship table includes multiple pieces of service information of the mobile terminal, DRX parameter values corresponding to the respective pieces of the service information, and priority information corresponding to the respective pieces of the service information. The service corresponding to the service information with the highest priority in the first mapping relationship table is the service that is most desired to be preserved in the mobile terminal, that is, the important service.

If there are some services with a low priority for transmitting data frequently, shorter DRX cycles may be configured for these services, which results in excessive power consumption and/or excessive CPU occupancy rate. Because of this, in the embodiment of the present disclosure described with reference to FIG. 3, the DRX parameter value corresponding to the service information with the highest priority is determined as the DRX parameter target value; in this way, after the DRX parameter configuration is updated subsequently according to the DRX parameter target value, the mobile terminal can prevent the service that is most desired to be preserved from being affected and give up other services, while satisfying the actual requirements (for example, reducing the power consumption of the battery, reducing the CPU occupancy rate, and so on).

Step 302, transmitting a DRX parameter modification request message carrying the DRX parameter target value to the base station.

In the embodiment of the present disclosure described with reference to FIG. 3, a specific implementation manner of the above Step 302 may be as follows: transmitting the DRX parameter modification request message carrying the DRX parameter target value to the base station via the high layer signaling. When the above first mapping relationship table further includes logical channel identifier (LCID) values corresponding to the respective DRX parameter values, a specific implementation manner of the above Step 302 may be as follows: first, querying the first mapping relationship table according to the DRX parameter target value (which is equivalent to the DRX parameter value corresponding to the service information with the highest priority), and acquiring the LCID value corresponding to the DRX parameter target value; and then, transmitting the acquired LCID value via the high layer control element, and transmitting the DRX parameter modification request message carrying the DRX parameter target value to the base station. It should be noted that the above LCID refers to the indication field of the high layer control element, and the indication field may have different names in different communication technology standards, and thus it is represented by the abbreviation LCID in the embodiments of the present disclosure.

In the embodiment of the present disclosure described with reference to FIG. 3, the meaning of each LCID value in the first mapping relationship table is shown in Table 2, wherein "index" represents an index, i.e., a LCID value, and "long DRX", "short DRX", "other DRX-1", "other DRX-2" and "reserved" each represent a set of specific DRX parameters. It should be noted that, in the embodiment of the present disclosure described with reference to FIG. 3, the specific values of the respective LCID values in the first mapping relationship table, and the meanings represented by the respective LCID values are not limited, that is to say, each of them may be adjusted according to actual requirements.

TABLE 2

| Index | Meaning |
|---|---|
| 01100 | Request to modify the DRX parameter to long DRX |
| 01101 | Request to modify the DRX parameter to short DRX |
| 01111 | Request to modify the DRX parameter to other DRX-1 |
| 10000 | Request to modify the DRX parameter to other DRX-2 |
| . . . | . . . |
| –10100 | Reserved |

Step 303, receiving the response message transmitted from the base station according to the DRX parameter modification request message.

Wherein, in the embodiment of the present disclosure described with reference to FIG. 3, a specific implementation manner of the above Step 303 is: receiving a response message transmitted from the base station including a first instruction indicating that the DRX parameter updating of the mobile terminal is confirmed; or, receiving a response message transmitted from the base station including a second instruction indicating that the DRX parameter updating of the mobile terminal is denied; or, receiving a response message transmitted from the base station including the second instruction indicating that the DRX parameter updating of the mobile terminal is denied and a third instruction for indicating the mobile terminal to continue to transmit the DRX parameter modification request message after a preset time.

In the embodiment of the present disclosure described with reference to FIG. 3, if the mobile terminal transmits the DRX parameter modification message to the base station via the high layer signaling, the response message is also received via the high layer signaling when the mobile terminal receives the response message. Specifically, the step of receiving the response message transmitted from the base station including the first instruction indicating that the DRX parameter updating of the mobile terminal is confirmed is: receiving the response message transmitted from the base station including the first instruction via the high layer signaling; the step of receiving the response message transmitted from the base station including the second instruction indicating that the DRX parameter updating of the mobile terminal is denied is: receiving the response message transmitted from the base station including the second instruction via the high layer signaling; the step of receiving the response message transmitted from the base station including the second instruction indicating that the DRX parameter updating of the mobile terminal is denied and the third instruction for indicating the mobile terminal to continue to transmit the DRX parameter modification request message after the preset time is: receiving the response message transmitted from the base station including the second instruction and the third instruction via the high layer signaling.

Moreover, in the embodiment of the present disclosure described with reference to FIG. 3, if the DRX parameter modification request message and the response message are transmitted via the high layer signaling (which may be the RRC signaling) between the mobile terminal and the base station, and the high layer signaling is the RRC signaling, the signaling added in the RRC layer is as follows:

```
--ASN1START
UEDRXmodifyrequirement-nr ::= SEQUENCE {
    requirementCause          ENUMERATED {
    lowbattery,emergency,other},
    DRXconfigValue            ENUMERATED
{longDRX,shortDRX,otherDRX}
}
--ASN1STOP
--ASN1START
UEDRXmodifycomplete-nr ::= SEQUENCE {
    DRXconfigValue            ENUMERATED
{longDRX,shortDRX,otherDRX}
}
--ASN1STOP
--ASN1START
UEDRXmodifyreject-nr ::= SEQUENCE {
    WaitTme                   INTEGER     ( 1..2560 )
}
--ASN1STOP
```

In the embodiment of the present disclosure described with reference to FIG. 3, a second mapping relationship table is preset in the above mobile terminal. The second mapping relationship table includes multiple instructions corresponding to the response message and LCID values corresponding to the respective instructions, wherein the above multiple instructions includes at least one of the first instruction, the second instruction and the third instruction.

In this case, in the embodiment of the present disclosure described with reference to FIG. 3, if the mobile terminal transmits the DRX parameter modification message to the base station via the high layer control element, the response message is also received via the high layer control element when the mobile terminal receives the response message. Specifically, the step of receiving the response message transmitted from the base station including the first instruction indicating that the DRX parameter updating of the mobile terminal is confirmed is: receiving the response message transmitted from the base station including the first instruction via the LCID value transmitted in the high layer control element; the step of receiving the response message transmitted from the base station including the second instruction indicating that the DRX parameter updating of the mobile terminal is denied is: receiving the response message transmitted from the base station including the second instruction via the LCID value transmitted in the high layer control element; the step of receiving the response message transmitted from the base station including the second instruction indicating that the DRX parameter updating of the mobile terminal is denied and the third instruction for indicating the mobile terminal to continue to transmit the DRX parameter modification request message after the preset time is: receiving the response message transmitted from the base station including the second instruction and the third instruction via the LCID value transmitted in the high layer control element. It should be noted that, since the mobile terminal can determine the instruction corresponding to the response message from the second mapping relationship table according to the LCID value transmitted in the high layer control element, the mobile terminal can receive the response message via the high layer control element. The above high layer control element may be the MAC control element.

In the embodiment of the present disclosure described with reference to FIG. 3, the relationships between the above individual instructions and the LCID values in the second mapping relationship table may be those as shown in table 3. In table 3, "index" represents an index, i.e., a LCID value. It should be noted that, in the embodiment of the present disclosure described with reference to FIG. 3, the specific values of the respective LCID values in the second mapping relationship table and the relationships between the respective LCID values and the instructions are not limited, that is to say, all of them can be adjusted according to actual requirements.

TABLE 3

| Index | Instruction |
| --- | --- |
| 10110 | First instruction |
| 10111 | Second instruction |
| 11000 | Third instruction |

Step 304, update the DRX parameter configuration by the mobile terminal according to the response message.

In the embodiment of the present disclosure described with reference to FIG. 3, a specific implementation manner of the above Step 304 is: if the response message includes the first instruction indicating that the DRX parameter updating of the mobile terminal is confirmed, updating the DRX parameter according to the DRX parameter target value, that is, using the DRX parameter target value to configure the DRX parameter of the mobile terminal; on the other hand, if the response message includes the second instruction indicating that the DRX parameter updating of the mobile terminal is denied and the third instruction for indicating the mobile terminal to continue to transmit the DRX parameter modification request message after a preset time, controlling the mobile terminal not to update the DRX parameter (i.e., keeping the original DRX parameter configuration unchanged), and to transmit the DRX parameter modification message to the base station after the preset time. Furthermore, if the response message includes only the second instruction indicating that the DRX parameter updating of the mobile terminal is denied, then the mobile terminal is controlled to not perform DRX parameter updating and keep the original DRX parameter configuration. Of course at this time the mobile terminal may also transmit the DRX parameter modification request message to the base station after a local preset time or an arbitrary time according to its own requirements (for example, the remaining battery capacity, etc.), so as to achieve the purpose of causing the DRX of the terminal to satisfy the actual requirements.

In the embodiment of the present disclosure described with reference to FIG. 3, when it is detected that the mobile terminal satisfies the preset DRX parameter modification condition, the DRX parameter modification request message carrying the DRX parameter target values (i.e., the DRX parameter value corresponding to the service information with the highest priority in the mobile terminal) to the base station, and the mobile terminal updates the DRX parameter configuration according to the response message returned by the base station. In this way, it is achieved to implement the DRX parameter configuration in combination with the actual requirements of the terminal so that the DRX of the terminal can satisfy the actual requirements.

Figure 4:
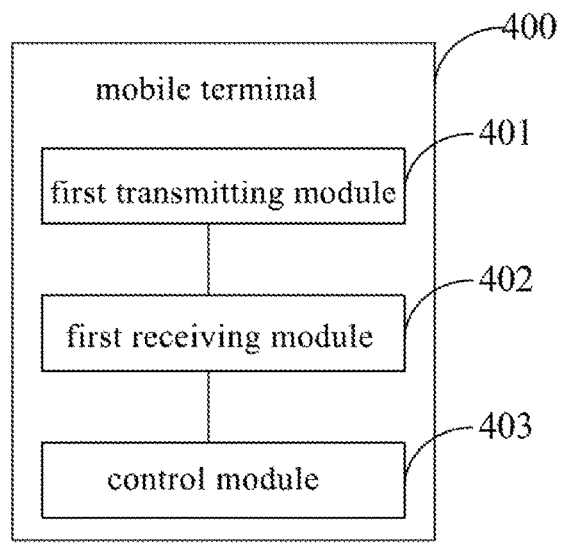
FIG. 4 is one of structural diagrams of a mobile terminal in some embodiments of the present disclosure.
Figure 5:
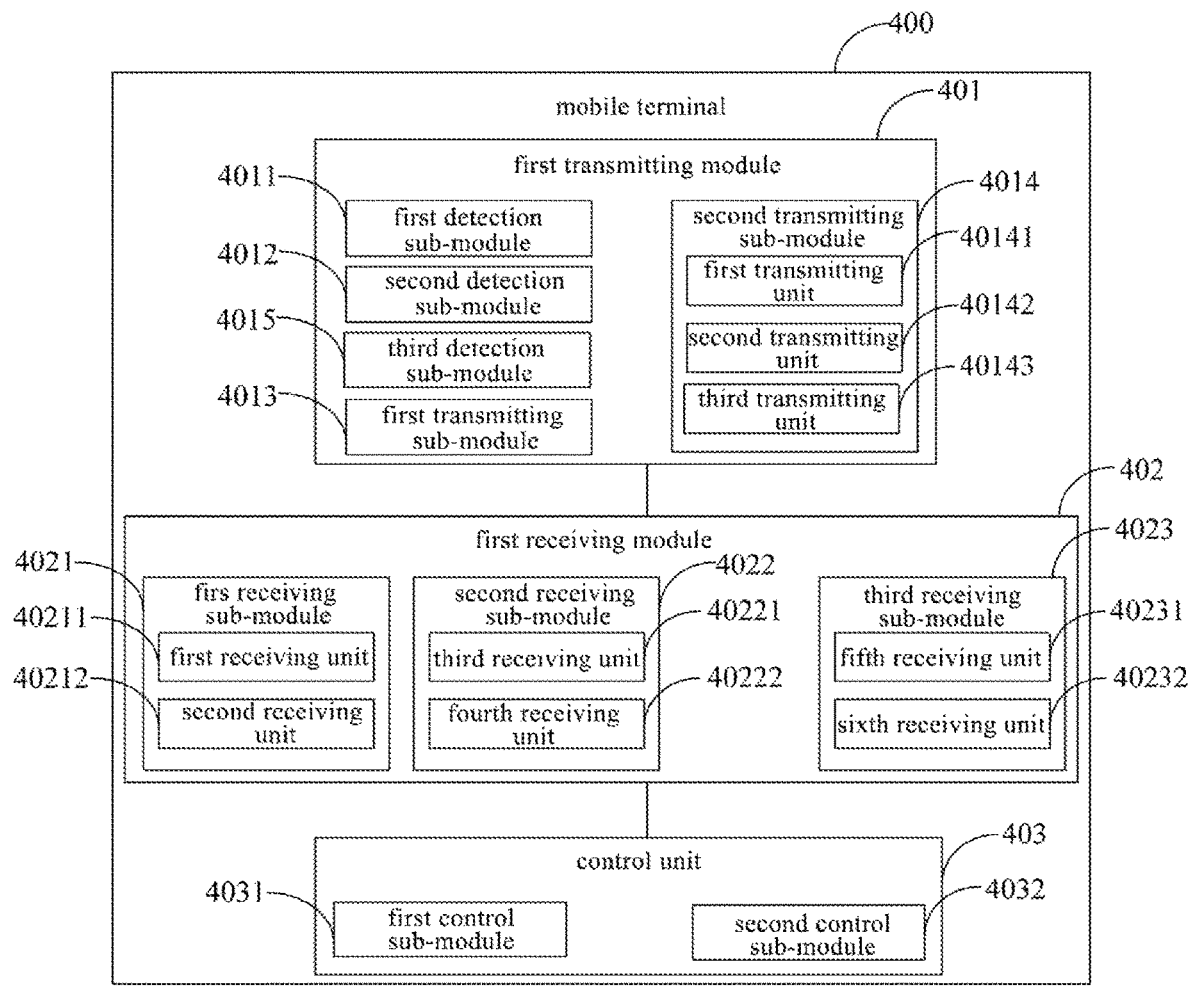
FIG. 5 is another one of the structural diagrams of the mobile terminal in some embodiments of the present disclosure.

As shown in FIGS. 4 to 5, in some embodiments of the present disclosure, provided is a mobile terminal 400 which includes:

a first transmitting module 401 for transmitting a DRX parameter modification request message to a base station when it is detected that the mobile terminal satisfies a preset DRX parameter modification condition;

a first receiving module 402 for receiving a response message corresponding to the DRX parameter modification request message and the response message is transmitted from the base station;

a control module 403 for controlling, according to the response message, the mobile terminal to update a DRX parameter configuration.

Optionally, the first transmitting module 401 includes:

a first detection sub-module 4011 for determining that the mobile terminal satisfying the preset DRX parameter modification condition is detected, if it is detected that remaining battery capacity of the mobile terminal is lower than preset battery capacity; or a second detection sub-module 4012 for determining that the mobile terminal satisfying the preset DRX parameter modification condition is detected, if it is detected that an occupancy rate of a central processing unit of the mobile terminal is higher than or equal to a preset occupancy rate; or a third detection sub-module 4015 for determining that the mobile terminal satisfying the preset DRX parameter modification condition is detected, if it is detected that a temperature of the mobile terminal is higher than or equal to a preset temperature.

Optionally, a first mapping relationship table is preset in the mobile terminal. The first mapping relationship table includes multiple pieces of service information of the mobile terminal, DRX parameter values corresponding to the respective pieces of the service information, and priority information corresponding to the respective pieces of the service information;

the first transmitting module 401 includes:

a first transmitting sub-module 4013 for determining a DRX parameter value corresponding to service information with a highest priority in the first mapping relationship table as a DRX parameter target value;

a second transmitting sub-module 4014 for transmitting a DRX parameter modification request message carrying the DRX parameter target value to the base station.

Optionally, the second transmitting sub-module 4014 includes:

a first transmitting unit 40141 for transmitting the DRX parameter modification request message carrying the DRX parameter target value to the base station via high layer signaling.

Optionally, the first mapping relationship table further includes LCID values corresponding to the respective DRX parameter values, and the second transmitting sub-module 4014 includes:

a second transmitting unit 40142 for querying the first mapping relationship table according to the DRX parameter target value, and acquiring a LCID value corresponding to the DRX parameter target value;

a third transmitting unit 40143 for transmitting the acquired LCID value via a high layer control element, and transmitting the DRX parameter modification request message carrying the DRX parameter target value to the base station.

Optionally, the first receiving module 402 includes:

a first receiving sub-module 4021 for receiving a response message transmitted from the base station including a first instruction indicating that the DRX parameter updating of the mobile terminal is confirmed; or a second receiving sub-module 4022 for receiving a response message transmitted from the base station including a second instruction indicating that the DRX parameter updating of the mobile terminal is denied; or a third receiving sub-module 4023 for receiving a response message transmitted from the base station including the second instruction indicating that the DRX parameter updating of the mobile terminal is denied and a third instruction for indicating the mobile terminal to continue to transmit the DRX parameter modification request message after the preset time.

Optionally, a second mapping relationship table is preset in the mobile terminal, the second mapping relationship table includes multiple instructions corresponding to the response message and LCID values corresponding to the respective instructions, the multiple instructions includes at least one of the first instruction, the second instruction and the third instruction.

Optionally, the first receiving sub-module 4021 includes:

a first receiving unit 40211 for receiving the response message transmitted from the base station including the first instruction via the high layer signaling; or a second receiving unit 40212 for receiving the response message transmitted from the base station including the first instruction via a LCID value transmitted in a high layer control element.

Optionally, the second receiving sub-module 4022 includes:

a third receiving unit 40211 for receiving the response message transmitted from the base station including the second instruction via the high layer signaling; or a fourth receiving unit 40222 for receiving the response message transmitted from the base station including the second instruction identified by a LCID value transmitted in a high layer control element.

Optionally, the third receiving sub-module 4023 includes:

a fifth receiving unit 40231 for receiving the response message transmitted from the base station including the second instruction and the third instruction via the high layer signaling; or a sixth receiving unit 40232 for receiving the response message transmitted from the base station including the second instruction and the third instruction identified by a LCID value transmitted in the high layer control element.

Optionally, the control module 403 includes:

a first control sub-module 4031 for updating a DRX parameter according to the DRX parameter target value, if the response message includes the first instruction indicating that the DRX parameter updating of the mobile terminal is confirmed;

a second control sub-module 4032 for control the mobile terminal not to perform the DRX parameter updating and to transmit the DRX parameter modification request message to the base station after the preset time, if the response message includes a second instruction indicating that the DRX parameter updating of the mobile terminal is denied and a third instruction for indicating the mobile terminal to continue to transmit the DRX parameter modification request message after the preset time.

In the embodiments of the present disclosure described with reference to FIGS. 4 to 5, the mobile terminal 400 transmits the DRX parameter modification request message to the base station when it detects that the preset DRX parameter modification condition is satisfied by itself, and is controlled to update the DRX parameter configuration according to the response message returned by the base station. In this way, it is achieved to implement the DRX parameter configuration in combination with the actual requirements of the terminal so that the DRX of the terminal can satisfy the actual requirements.

It should be noted that, the mobile terminals provided by the embodiments of the present disclosure described with reference to FIGS. 4 to 5 are the mobile terminals to which the above configuration method of DRX parameter applied to a mobile terminal is applied. That is to say, all the embodiments of the above method are applicable to such mobile terminals, and can achieve the same or similar beneficial effects.

Figure 6:
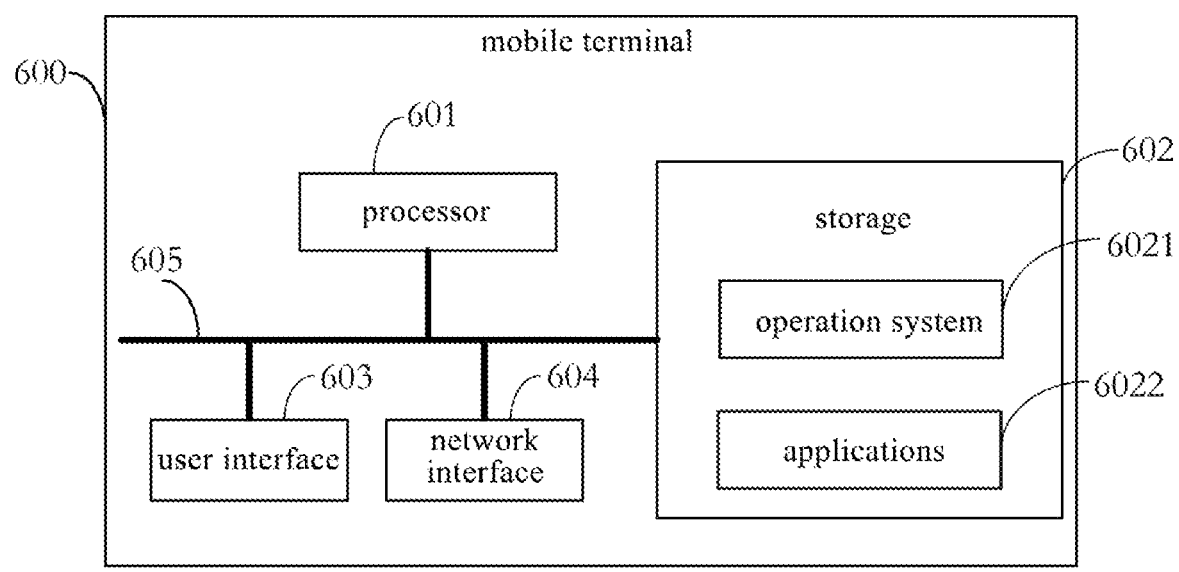
FIG. 6 is a structural diagram of another mobile terminal in some embodiments of the present disclosure.

As shown in FIG. 6, it shows a block diagram of a mobile terminal 600 in some embodiments of the present disclosure. The mobile terminal 600 shown in FIG. 6 includes: at least one processor 601, a storage 602, at least one network interface 604, and a user interface 603. The components in the mobile terminal 600 are coupled with each other via a bus system 605. It will be appreciated that the bus system 605 is used to implement the connection communication between these components. In addition to a data bus, the bus system 605 further includes a power bus, a control bus and a status signal bus. However, for clarity of description, various buses in FIG. 6 are labeled as the bus system 605.

The user interface 603 may include a display, a keyboard or a pointing device (such as a mouse, a trackball, a touch pad or a touch screen, etc.).

It will be appreciated that the storage 602 in an embodiment of the present disclosure may be a volatile memory or a non-volatile memory, or may include both of them. The non-volatile memory may be a read-only memory (ROM), a programmable read-only memory (PROM), an erasable programmable read-only memory (Erasable PROM, EPROM), an electrically erasable memory programmable read-only memory (EEPROM), or a flash memory. The volatile memory may be a random access memory (RAM), which is used as an external cache. By way of exemplary but non-limiting illustration, many forms of RAM are available, such as static random access memory (Static RAM, SRAM), dynamic random access memory (Dynamic DRAM, DRAM), synchronous dynamic random access memory (Synchronous DRAM, SDRAM), double data rate synchronous dynamic random access memory (Double Data Rate SDRAM, DDRSDRAM), enhanced synchronous dynamic random access memory (Enhanced SDRAM, ESDRAM), synchronous link dynamic random access memory (Synchlink DRAM, SDRAM), and direct memory bus random access memory (Direct Rambus RAM, DRRAM). The storage 602 of the systems and methods described herein is intended to include, but not limited to, these and any other suitable types of memories.

In some implementations, the storage 602 stores the following elements: an operation system 6021 and an application 6022; and can execute modules or data structures, or subsets thereof, or extensions thereof.

The operation system 6021 includes various system programs, such as a framework layer, a core library layer, a driver layer, and the like, for implementing various basic services and processing hardware-based tasks. The application 6022 includes various applications, such as a media player, a browser, etc., for implementing various application services. A program implementing the method of an embodiment of the present disclosure may be included in the application 6022.

In the embodiments of the present disclosure, by calling the programs or instructions stored in the storage 602 (specifically, which may be the programs or instructions stored in the application 6022, the processor 601 is configured to transmit the DRX parameter modification request message to the base station when it is detected that the mobile terminal satisfies the preset DRX parameter modification condition; to receive the response massage transmitted from the base station according to the DRX parameter modification request message; and to control, according to the response message, the mobile terminal to update the DRX parameter configuration.

The methods as disclosed by the above embodiments of the present disclosure may be applied to the processor 601, or implemented by the processor 601. The processor 601 may be an integrated circuit chip having a signal processing capability. During the implementation process, the steps of the above methods may be implemented by a hardware integrated logic circuit or instructions in a software form in the processor 601. The above processor 601 may be a general purpose processor, a digital signal processor (DSP), an application specific integrated circuit (ASIC), a field programmable gate array (FPGA), or other programmable logic devices, discrete gates or transistor logic devices, discrete hardware components. The methods, steps, and logical block diagrams disclosed in the embodiments of the present disclosure may be implemented or carried out. The general purpose processor may be a microprocessor, or the processor may be any conventional processor or the like. The steps of the methods disclosed in connection with the embodiments of the present disclosure may be directly implemented by a hardware decoding processor or by a combination of hardware and software modules in the decoding processor. The software modules may be located in a conventional storage medium in the art, such as a random access memory, a flash memory, a read-only memory, a programmable read-only memory or an electrically erasable programmable memory, registers, and the like. The storage medium is located in the storage 602, and the processor 601 reads the information in the storage 602 and implements the steps of the above methods in combination with its hardware.

It will be appreciated that the embodiments described herein may be implemented by hardware, software, firmware, middleware, microcode, or a combination thereof. As for the hardware implementation, the processing unit may be implemented in one or more Application Specific Integrated Circuits (ASICs), a digital signal processor (DSP), a digital signal processing device (DSP Device, DSPD), a programmable logic device (PLD), a field-programmable gate array (FPGA), a general purpose processor, a controller, a microcontroller, a microprocessor, other electronic unit for performing the functions described herein, or a combination thereof.

As for the software implementation, the techniques described herein may be implemented by modules (e.g., procedures, functions, and so on) that perform the functions described herein. The software codes may be stored in the storage and executed by the processor. The storage may be implemented in the processor or external to the processor.

Optionally, the processor 601 is further configured to: determine that the mobile terminal satisfying the DRX parameter modification condition is detected if it is detected that the remaining battery capacity of the mobile is less than a preset battery capacity; or, to determine that the mobile terminal satisfying the DRX parameter modification condition is detected if it is detected that the occupancy rate of the central processing unit of the mobile terminal is higher than or equal to a preset occupancy rate; or, to determine that the mobile terminal satisfying the preset DRX parameter modification condition is detected if it is detected that the temperature of the mobile terminal is higher than or equal to a preset temperature.

Optionally, a first mapping relationship table is preset in the mobile terminal. The first mapping relationship table includes multiple pieces of service information of the mobile terminal, DRX parameter values corresponding to the respective pieces of the service information, and priority information corresponding to the respective pieces of the service information. The processor 601 is further configured to determine the DRX parameter value corresponding to the service information with the highest priority in the first mapping relationship table as the DRX parameter target value; and transmit a DRX parameter modification request message carrying the DRX parameter target value to the base station.

Optionally, the processor 601 is further configured to transmit the DRX parameter modification request message carrying the DRX parameter target value to the base station via the high layer signaling.

Optionally, the first mapping relationship table further includes logical channel identifier (LCID) values corresponding to the respective DRX parameter values, and the processor 601 is further configured to: query the first mapping relationship table according to the DRX parameter target value, and acquire a LCID value corresponding to the DRX parameter target value; and transmit the acquired LCID value via the high layer control element, and transmit the DRX parameter modification request message carrying the DRX parameter target value to the base station.

Optionally, the processor 601 is further configured to: receive a response message transmitted from the base station including the first instruction indicating that the DRX parameter updating of the mobile terminal is confirmed; or receive a response message transmitted from the base station including the second instruction indicating that the DRX parameter updating of the mobile terminal is denied; or receive a response message transmitted from the base station including the second instruction indicating that the DRX parameter updating of the mobile terminal is denied and the third instruction for indicating the mobile terminal to continue to transmit the DRX parameter modification request message after the preset time.

A second mapping relationship table is preset in the mobile terminal. The second mapping relationship table includes multiple instructions corresponding to the response message and LCD values corresponding to the respective instructions, the multiple instructions includes the first instruction, the second instruction and the third instruction.

Optionally, the processor 601 is further configured to: receive the response message transmitted from the base station including the first instruction via the high layer signaling; or receive the response message transmitted from the base station including the first instruction identified by a LCD value transmitted in the high layer control element.

Optionally, the processor 601 is further configured to: receive the response message transmitted from the base station including the second instruction via the high layer signaling; or receive the response message transmitted from the base station including the second instruction identified by a LCID value transmitted in the high layer control element.

Optionally, the processor 601 is further configured to: receive the response message transmitted from the base station including the second instruction and the third instruction via the high layer signaling; or receive the response message transmitted from the base station including the second instruction and the third instruction identified by a LCID value transmitted in the high layer control element.

Optionally, the processor 601 is further configured to: update a DRX parameter according to the DRX parameter target value if the response message includes the first instruction indicating that the DRX parameter updating of the mobile terminal is confirmed; control the mobile terminal not to perform the DRX parameter updating and to transmit the DRX parameter modification request message to the base station after the preset time, if the response message includes the second instruction indicating that the DRX parameter updating of the mobile terminal is denied and the third instruction for indicating the mobile terminal to continue to transmit the DRX parameter modification request message after the preset time.

The mobile terminal 600 can implement various processes implemented by the mobile terminal in the foregoing embodiments. To avoid repetition, details are not described herein again.

In the embodiment of the present disclosure described with reference to FIG. 6, the mobile terminal transmits the DRX parameter modification request message to the base station when it detects that the preset DRX parameter modification condition is satisfied by itself, and updates the DRX parameter configuration according to the response message returned by the base station. Thus, it is achieved to implement the DRX parameter configuration in combination with actual requirements of the terminal so that the DRX of the terminal satisfies the actual requirements.

Figure 7:
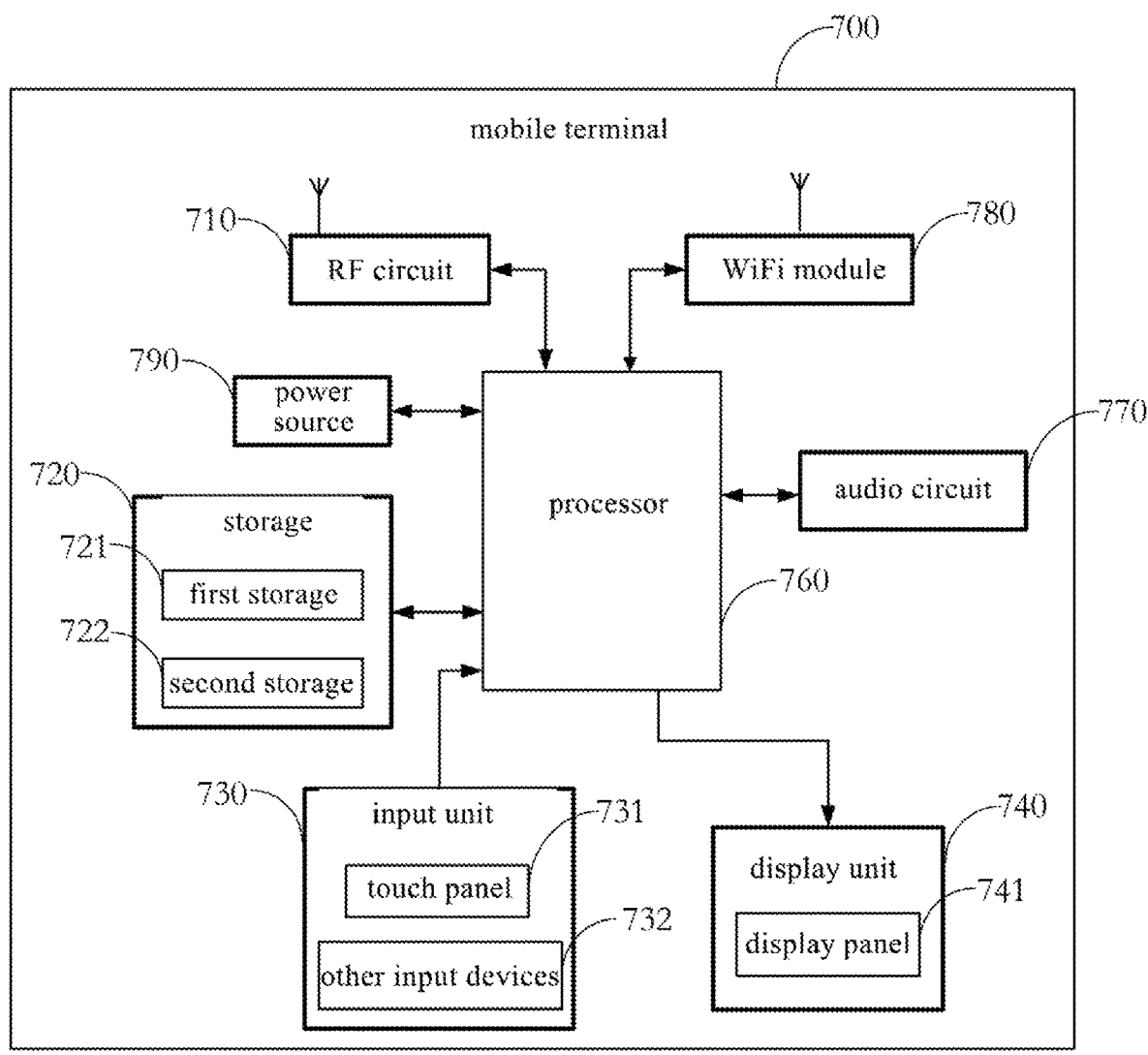
FIG. 7 is a structural diagram of still another mobile terminal in some embodiments of the present disclosure.

As shown in FIG. 7, it shows a structural diagram of a mobile terminal 700 in some embodiments of the present disclosure. Specifically, the mobile terminal 700 in FIG. 7 may be a mobile, a tablet, a personal digital assistant (PDA), or an on-board computer, etc.

The mobile terminal 700 in FIG. 7 includes a radio frequency (RF) circuit 710, a storage 720, an input unit 730, a display unit 740, a processor 760, an audio circuit 770, a wireless fidelity (WiFi) module 780 and a power source 790.

The input unit 730 may be used to receive numeral or character information input by a user, and generate signal inputs related to the user settings or functional control of the mobile terminal 700. Specifically, in an embodiment of the present disclosure, the input unit 730 may include a touch panel 731. The touch panel 731, which is also called a touch screen, may collect a touch operation of the user on or near the touch panel (for example, an operation on the touch panel 731 by the user using any suitable object or accessory such as a finger, a stylus pen, etc.), and drive a corresponding connection device according to a preset program. Optionally, the touch panel 731 may include two parts of a touch detection device and a touch controller. The touch detection device detects a touched position of the user and a signal generated by the touch operation, and transmits the signal to the touch controller; the touch controller receives the touch signal from the touch detection device, converts it into contact coordinates, and transmits the same to the processor 760, and the touch controller can receive commands transmitted from the processor 760 and execute them. Furthermore, the touch panel 731 may be implemented in various types of touch panels, such as a resistive, a capacitive, an infrared, or a surface acoustic wave touch panel. In addition to the touch panel 731, the input unit 730 may further include other input device 732 which may include, but not limited to, one or more of a physical keyboard, function keys (such as volume control buttons, switch buttons, etc.), a trackball, a mouse, a joystick, and so on.

The display unit 740 may be used to display the information input by the user or the information provided to the user and various menu interfaces of the mobile terminal 700. The display unit 740 may include a display panel 741; optionally, the display panel 741 may be configured by a liquid crystal device (LCD) or an organic light-emitting diode (OLED).

It should be noted that the touch panel 731 may cover the display panel 741 to form a touch display screen. When the touch display screen detects a touch operation on or near it, transmits a signal to the processor 760 to determine the type of the touch event. Then, the processor 760 provides a corresponding visual input on the touch display screen according to the type of the touch event.

The touch display screen includes a display area for application interfaces and a display area for common controls. The arrangement manner of the display area for application interfaces and the display area for common controls may include, but not limited to, an up-and-down arrangement, a left-and-right arrangement, etc., to distinguish the two display areas. The display area for application interfaces may be used to display interfaces of applications. Each interface may include an icon of at least one application and/or interface elements such as desktop controls (e.g., a widget). The display area for application interfaces may also be an empty interface that does not contain any content. The display area for common controls is used to display the controls with high usage, such as setting buttons, interface numbers, scroll bars, phone icons, and other application icons.

The processor 760 is a control center of the mobile terminal 700, which connects various parts of the mobile terminal using various interfaces and lines; by running or executing software programs and/or modules stored in the first storage 721, and calling data stored in the second storage 722 to perform various functions and processing data of the mobile terminal 700, the processor 760 performs an overall monitoring on the mobile terminal 700. Optionally, the processor 760 may include one or more processing units.

In the embodiments of the present disclosure, by calling the software programs and/or modules stored in the first storage 721, and the data stored in the second storage 722, the processor 760 is caused to transmit the DRX parameter modification request message to the base station when the mobile terminal satisfying the preset DRX parameter modification condition is detected; receive the response message transmitted from the base station according to the DRX parameter modification request message; and control the mobile terminal to update the DRX parameter configuration according to the response message.

Optionally, the processor 760 is further configured to: determine that the mobile terminal satisfying the DRX parameter modification condition is detected if it is detected that the remaining battery capacity of the mobile is less than a preset battery capacity; or, to determine that the mobile terminal satisfying the DRX parameter modification condition is detected if it is detected that the occupancy rate of the central processing unit of the mobile terminal is higher than or equal to a preset occupancy rate; or, to determine that the mobile terminal satisfying the preset DRX parameter modification condition is detected if it is detected that the temperature of the mobile terminal is higher than or equal to a preset temperature.

Optionally, a first mapping relationship table is preset in the mobile terminal. The first mapping relationship table includes multiple pieces of service information of the mobile terminal, DRX parameter values corresponding to the respective pieces of the service information, and priority information corresponding to the respective pieces of the service information. The processor 760 is further configured to determine the DRX parameter value corresponding to the service information with the highest priority in the first mapping relationship table as the DRX parameter target value; and transmit a DRX parameter modification request message carrying the DRX parameter target value to the base station.

Optionally, the processor 760 is further configured to transmit the DRX parameter modification request message carrying the DRX parameter target value to the base station via the high layer signaling.

Optionally, the first mapping relationship table further includes logical channel identifier (LCID) values corresponding to the respective DRX parameter values, and the processor 760 is further configured to: query the first mapping relationship table according to the DRX parameter target value, and acquire a LCID value corresponding to the DRX parameter target value; and transmit the acquired LCID value via the high layer control element, and transmit the DRX parameter modification request message carrying the DRX parameter target value to the base station.

Optionally, the processor 760 is further configured to: receive a response message transmitted from the base station including the first instruction indicating that the DRX parameter updating of the mobile terminal is confirmed; or receive a response message transmitted from the base station including the second instruction indicating that the DRX parameter updating of the mobile terminal is denied; or receive a response message transmitted from the base station including the second instruction indicating that the DRX parameter updating of the mobile terminal is denied and the third instruction for indicating the mobile terminal to continue to transmit the DRX parameter modification request message after the preset time.

A second mapping relationship table is preset in the mobile terminal. The second mapping relationship table includes multiple instructions corresponding to the response message and LCID values corresponding to the respective instructions, the multiple instructions includes the first instruction, the second instruction and the third instruction.

Optionally, the processor 760 is further configured to: receive the response message transmitted from the base station including the first instruction via the high layer signaling; or receive the response message transmitted from the base station including the first instruction identified by a LCID value transmitted in the high layer control element.

Optionally, the processor 760 is further configured to: receive the response message transmitted from the base station including the second instruction via the high layer signaling; or receive the response message transmitted from the base station including the second instruction identified by a LCID value transmitted in the high layer control element.

Optionally, the processor 760 is further configured to: receive the response message transmitted from the base station including the second instruction and the third instruction via the high layer signaling; or receive the response message transmitted from the base station including the second instruction and the third instruction identified by a LCID value transmitted in the high layer control element.

Optionally, the processor 760 is further configured to: update a DRX parameter according to the DRX parameter target value if the response message includes the first instruction indicating that the DRX parameter updating of the mobile terminal is confirmed; control the mobile terminal not to perform the DRX parameter updating and to transmit the DRX parameter modification request message to the base station after the preset time, if the response message includes the second instruction indicating that the DRX parameter updating of the mobile terminal is denied and the third instruction for indicating the mobile terminal to continue to transmit the DRX parameter modification request message after the preset time.

It can be seen that, in the embodiment of the present disclosure described with reference to FIG. 7, the mobile terminal transmits the DRX parameter modification request message to the base station when it detects that the preset DRX parameter modification condition is satisfied by itself, and updates the DRX parameter configuration according to the response message returned by the base station. Thus, it is achieved to implement the DRX parameter configuration in combination with actual requirements of the terminal so that the DRX of the terminal satisfies the actual requirements.

Figure 8:
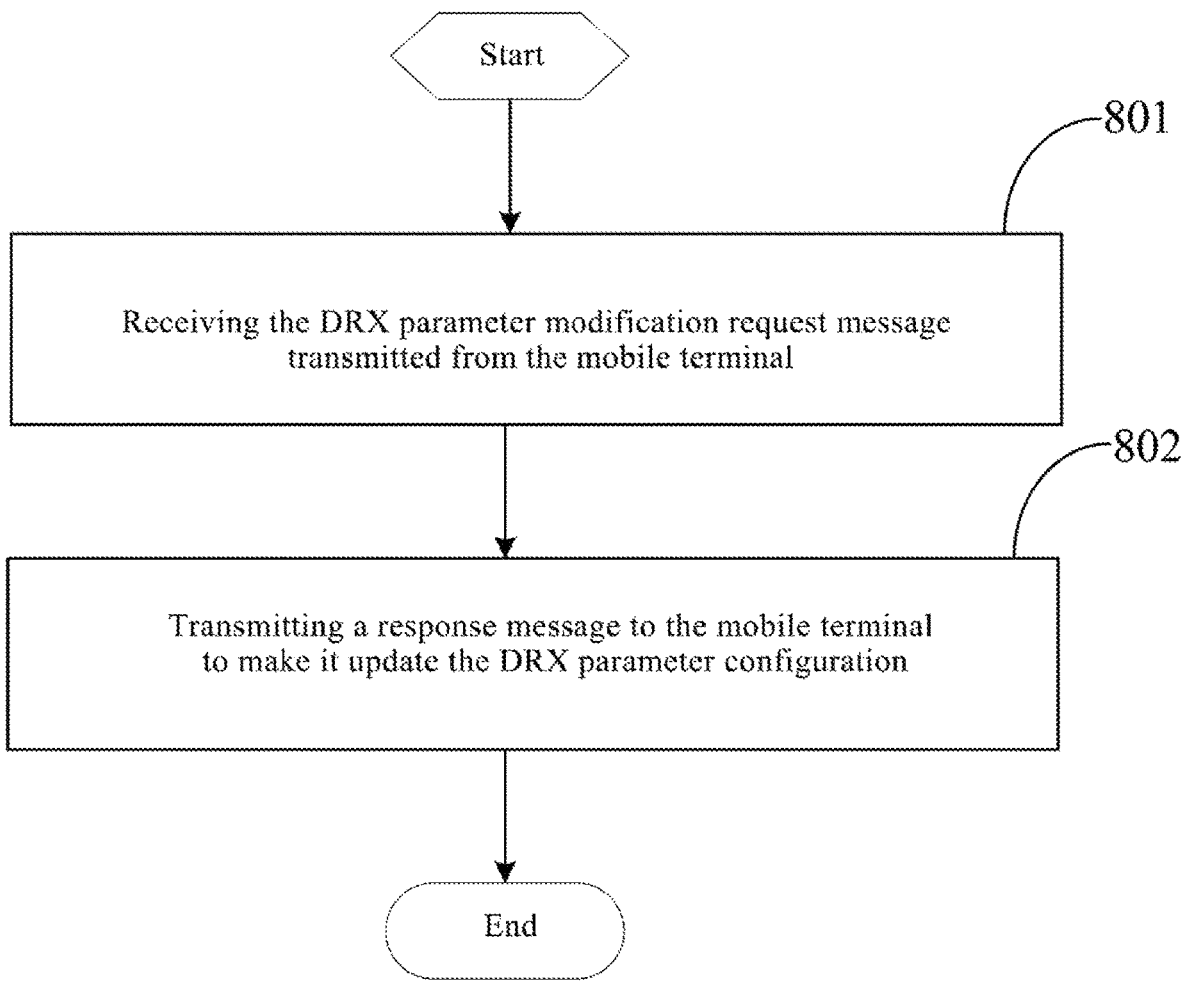
FIG. 8 is a flow chart of another configuration method of DRX parameter in some embodiments of the present disclosure.

As shown in FIG. 8, in some embodiments of the present disclosure, provided is a configuration method of DRX parameter applied to a base station, the method includes:

Step 801, receiving the DRX parameter modification request message transmitted from the mobile terminal.

In the embodiment of the present disclosure described with reference to FIG. 8, a specific implementation manner of the above Step 801 may be as follows: receiving the DRX parameter modification request message carrying the DRX parameter target value transmitted from the mobile terminal.

Specifically, in the embodiment of the present disclosure described with reference to FIG. 8, the DRX parameter modification request message carrying the DRX parameter target value transmitted from the mobile terminal may be received via high layer signaling. Furthermore, in a case that a third mapping relationship table is preset in the base station, and the third mapping relationship table includes multiple DRX parameter target values and LCID values corresponding to the respective DRX parameter target values, an specific implementation manner of the above Step 801 may also be as follows: receiving the DRX parameter modification request message carrying the DRX parameter target value transmitted from the mobile terminal via the high layer signaling. Since the base station can determine the DRX parameter target value from the third mapping relationship table according to a LCID value transmitted in a high layer control element, the base station may receive the DRX parameter modification request message carrying a DRX parameter target value transmitted from the mobile terminal by using the LCID value transmitted in the high layer control element. It should be noted that, the contents of the above third mapping relationship table may be similar to those of the first mapping relationship table, and thus the third mapping relationship table is no longer described too much here. The above high layer signaling may be the RRC signaling, and the high layer control element may be the MAC control element.

Step 802, transmitting a response message to the mobile terminal to make it update the DRX parameter configuration.

In the embodiment of the present disclosure described with reference to FIG. 8, a fourth mapping relationship table is preset in the base station. The fourth mapping relationship table includes multiple instructions corresponding to the response message and LCID values corresponding to the respective instructions, wherein the multiple instructions includes: a first instruction indicating that the DRX parameter updating of the mobile terminal is confirmed; a second instruction indicating that the DRX parameter updating of the mobile terminal is denied; and a third instruction for indicating the mobile terminal to continue to transmit the DRX parameter modification request message after a preset time. It should be noted that, the contents of the above fourth mapping relationship table may be similar to those of the second mapping relationship table, and thus the fourth mapping relationship table is no longer described too much here.

In the embodiment of the present disclosure described with reference to FIG. 8, a specific implementation manner of the above Step 802 may be as follows: determining at least one service among the services carried by the mobile terminal by whether the remaining time is less than a predetermining time; if there is not a service with the remaining time less than the predetermining time in the services carried by the mobile terminal, transmitting a response message including the first instruction to the mobile terminal; if there is at least one service with the remaining time less than the predetermining time in the services carried by the mobile terminal, transmitting a response message including the second instruction to the mobile terminal. It should be noted that, the base station may transmit a response message including the second instruction and the third instruction to the mobile terminal according to an actual situation. Specifically, if there is a service with the remaining time less than the predetermining time in the services carried by the mobile terminal, the response message including the second instruction and the third instruction is transmitted to the mobile terminal. In this way, the mobile terminal may continue to transmit a DRX parameter modification request message after a preset time, so as to cause the DRX parameters of the mobile terminal to satisfy actual requirements. It should be noted that, a specific value of the above preset time is not limited in the embodiment of the present disclosure described with reference to FIG. 8, and the preset time may be set reasonably by the base station according to the actual service situation of the mobile terminal. Thus, the preset time is not a fixed value, but a variable value.

In the embodiment of the present disclosure described with reference to FIG. 8, if the base station receives the DRX parameter modification request message transmitted from the mobile terminal via high layer signaling, the base station may also transmit the response message to the mobile terminal via the high layer signaling. Specifically, the step of transmitting the response message including the first instruction to the mobile terminal is: transmitting the response message including the first instruction to the mobile terminal via the high layer signaling; the step of transmitting the response message including the second instruction to the mobile terminal is: transmitting the response message including the second instruction to the mobile terminal via the high layer signaling; and the step of transmitting the response message including the second instruction and the third instruction to the mobile terminal is: transmitting the response message including the second instruction and the third instruction to the mobile terminal via the high layer signaling.

Similarly, if the base station receives the DRX parameter modification request message transmitted from the mobile terminal via a high layer control element, the base station may also transmit the response message to the mobile terminal via the high layer control element. Specifically, the step of transmitting the response message including the first instruction to the mobile terminal is: transmitting the response message including the first instruction to the mobile terminal by transmitting a LCID value corresponding to the first instruction to the mobile terminal via the high layer control element; the step of transmitting the response message including the second instruction to the mobile terminal is: transmitting the response message including the second instruction to the mobile terminal by transmitting a LCID value corresponding to the second instruction to the mobile terminal via the high layer control element; and the step of transmitting the response message including the second instruction and the third instruction to the mobile terminal is: transmitting the response message including the second instruction and the third instruction to the mobile terminal by transmitting a LCID value corresponding to the second instruction and a LCID value corresponding to the third instruction to the mobile terminal via the high layer control element.

In the embodiment of the present disclosure described with reference to FIG. 8, after the base station receives the DRX parameter modification request message transmitted from the mobile terminal, it returns a response message to the mobile terminal to make the mobile terminal update the DRX parameter configuration according to the response message. Thus, it is achieve to implement the DRX parameter configuration in combination with actual requirements of the mobile terminal, so that the DRX of the mobile terminal satisfies the actual requirements.

Figure 9:
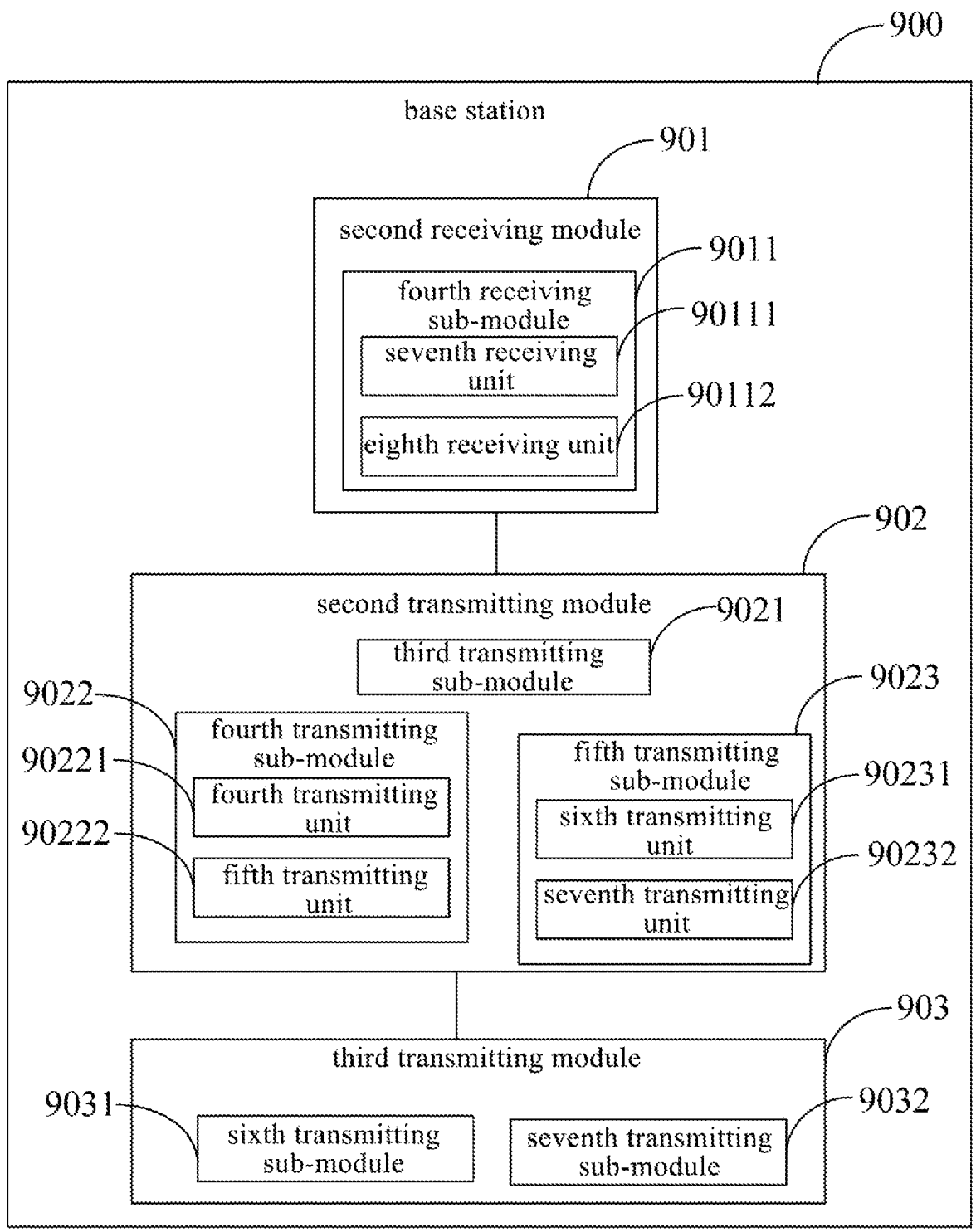
FIG. 9 is a structural diagram of a base station in some embodiments of the present disclosure.

As shown in FIG. 9, in some embodiments of the present disclosure, a base station 900 is provided. The base station 900 includes:

a second receiving module 901 for receiving a DRX parameter modification request message transmitted from a mobile terminal;

a second transmitting module 902 for transmitting a response message to the mobile terminal to make the mobile terminal update a DRX parameter configuration.

Optionally, the second receiving module 901 includes:

a fourth receiving sub-module 9011 for receiving a DRX parameter modification request message carrying a DRX parameter target value transmitted from the mobile terminal.

Optionally, a third mapping relationship table is preset in the base station. The third mapping relationship table includes multiple DRX parameter target values and LCID values corresponding to the respective DRX parameter target values, the fourth receiving sub-module 9011 includes:

a seventh receiving unit 90111 for receiving the DRX parameter modification request message carrying the DRX parameter target value transmitted from the mobile terminal via high layer signaling; or an eighth receiving unit 90112 for receiving a DRX parameter modification request message carrying a DRX parameter target value transmitted from the mobile terminal identified by a LCID value transmitted in a high layer control element.

Optionally, a fourth mapping relationship table is preset in the base station. The fourth mapping relationship table includes multiple instructions corresponding to the response message and LCID values corresponding to the respective instructions. The multiple instructions includes: a first instruction indicating that the DRX parameter updating of the mobile terminal is confirmed; a second instruction indicating that the DRX parameter updating of the mobile terminal is denied; and a third instruction for indicating the mobile terminal to continue to transmit the DRX parameter modification request message after a preset time.

Optionally, the second transmitting module 902 includes:

a third transmitting sub-module 9021 for determining at least one service among the services carried by the mobile terminal by whether the remaining time is less than a predetermining time; if there is not a service with the remaining time less than the predetermining time in the services carried by the mobile terminal, triggering a fourth transmitting sub-module 9022; and if there is at least one service with the remaining time less than the predetermining time in the services carried by the mobile terminal, triggering a fifth transmitting sub-module 9023;

the fourth transmitting sub-module 9022 for transmitting a response message including the first instruction to the mobile terminal according to the triggering of the third transmitting sub-module 9021;

the fifth transmitting sub-module 9023 for transmitting a response message including the second instruction to the mobile terminal according to the triggering of the third transmitting sub-module 9021.

Optionally, the base station further includes:

a third transmitting module 903 for, if there is a service with the remaining time less than the predetermining time in the services carried by the mobile terminal, transmitting a response message comprising the second instruction and the third instruction to the mobile terminal.

Optionally, the fourth transmitting sub-module 9022 includes:

a fourth transmitting unit 90221 for transmitting the response message including the first instruction to the mobile terminal via high layer signaling; or a fifth transmitting unit 90222 for transmitting the response message including the first instruction to the mobile terminal by transmitting a LCID value corresponding to the first instruction to the mobile terminal via a high layer control element.

Optionally, the fifth transmitting sub-module 9023 includes:

a sixth transmitting unit 90231 for transmitting the response message comprising the second instruction to the mobile terminal via high layer signaling; or a seventh transmitting unit 90232 for transmitting the response message including the second instruction to the mobile terminal by transmitting a LCID value corresponding to the second instruction to the mobile terminal via a high layer control element.

Optionally, the third transmitting module 903 comprises:

a sixth transmitting sub-module 9031 for transmitting the response message including the second instruction and the third instruction to the mobile terminal via high layer signaling; or a seventh transmitting sub-module 9032 for transmitting the response message including the second instruction and the third instruction to the mobile terminal by transmitting a LCID value corresponding to the second instruction and a LCID value corresponding to the third instruction to the mobile terminal via a high layer control element.

In the embodiment of the present disclosure described with reference to FIG. 9, after the base station 900 receives the DRX parameter modification request message transmitted from the mobile terminal, it returns a response message to the mobile terminal to make the mobile terminal update the DRX parameter configuration according to the response message. Thus, it is possible to implement the DRX parameter configuration in combination with actual requirements of the mobile terminal, so that the DRX of the mobile terminal satisfies the actual requirements.

It should be noted that, the base station provided by the embodiment of the present disclosure described with reference to FIG. 9 is the base station to which the above configuration method of DRX parameter applied to a base station is applied. That is to say, all the embodiments of the above method are applicable to such base station, and can achieve the same or similar beneficial effects.

It will be appreciated by those of ordinary skill in the art that the exemplary units and algorithm steps described in connection with the embodiments disclosed herein can be implemented in electronic hardware or a combination of computer software and electronic hardware. Whether these functions are performed in hardware or software depends on particular applications and design constraints of the solution. A person skilled in the art can use different methods to implement the described functions for respective particular applications, but such implementations should not be considered to be beyond the scope of the disclosure.

A person skilled in the art can clearly understand that, for the convenience and brevity of the description, the specific working processes of the system, the device and the unit described above can refer to the corresponding processes in the foregoing method embodiments, and details are not described herein again.

It should be appreciated that, in the embodiments provided in the present application, the disclosed devices and methods may be implemented by another manner. For example, the device embodiments described above are merely illustrative. For example, the division of the units is only a logical function division. In actual implementation, there may be another division manner. For example, multiple units or components may be combined or integrated into another system, or some features may be ignored or not executed. In addition, the mutual coupling or direct coupling or communication connection as shown or discussed may be an indirect coupling or communication connection through some interfaces, devices or units, and may be in an electrical form, a mechanical form or any other form.

The units described as separate components may or may not be physically separated; the components displayed as units may or may not be physical units, that is, may be located in one place, or may be distributed to multiple network units. Some or all of the units may be selected according to actual requirements to achieve the purpose of the solutions of the embodiments.

In addition, the functional units in various embodiments of the present disclosure may be integrated into one processing unit, or the individual units may exist physically separately, or two or more units may be integrated into one unit.

If the functions are implemented in the form of a software functional unit and are sold or used as a standalone product, it may be stored in a computer readable storage medium. Based on such an understanding, the essential portion, or the portion contributing to the related art, or the portion of the technical solutions, of the present disclosure may be embodied in the form of a software product which is stored in a storage medium and includes a number of instructions to cause a computer device (which may be a personal computer, a server, or a network device, etc.) to perform all or part of the steps of the methods described in various embodiments of the present disclosure. The foregoing storage medium includes various media that can store program codes, such as a USB flash drive, a mobile hard disk, a ROM, a RAM, a magnetic disk, an optical disk, and the like.

The above descriptions are merely the exemplary implementations of the present disclosure, but the protective scope of the present disclosure is not limited thereto. Those changes or substitutions conceived easily by a person skilled in the art without departing from the scope of the present disclosure are intended to be covered in the protective scope of the present disclosure. Therefore, the protective scope of the present disclosure should be limited by the appended claims.

What is claimed is:

1. A configuration method of discontinuous reception (DRX) parameter applied to a mobile terminal, comprising:
   transmitting, upon detecting that the mobile terminal satisfies a preset DRX parameter modification condition, a DRX parameter modification request message to a base station;
   receiving a response message corresponding to the DRX parameter modification request message and the response message is transmitted from the base station; and
   updating a DRX parameter configuration by the mobile terminal according to the response message;
   wherein the step of receiving the response message corresponding to the DRX parameter modification request message and the response message is transmitted from the base station comprises:
   receiving a response message transmitted from the base station which comprises a first instruction indicating that the DRX parameter updating of the mobile terminal is confirmed; or
   receiving a response message transmitted from the base station which comprises a second instruction indicating that the DRX parameter updating of the mobile terminal is denied; or
   receiving a response message transmitted from the base station which comprises the second instruction indicating that the DRX parameter updating of the mobile terminal is denied and a third instruction for indicating the mobile terminal to continue to transmit the DRX parameter modification request message after a preset time;
   wherein a second mapping relationship table is preset in the mobile terminal, the second mapping relationship table comprises multiple instructions corresponding to the response message and LCID values corresponding to the respective instructions, the multiple instructions comprise at least one of the first instruction, the second instruction and the third instruction;
   wherein the step of receiving the response message transmitted from the base station which comprises the second instruction indicating that the DRX parameter updating of the mobile terminal is denied and the third instruction for indicating the mobile terminal to continue to transmit the DRX parameter modification request message after the preset time comprises:
   receiving, via the high layer signaling, the response message transmitted from the base station which comprises the second instruction and the third instruction; or
   receiving the response message transmitted from the base station which comprises the second instruction identified by a LCID value transmitted in a high layer control element and the third instruction identified by a LCID value transmitted in a high layer control element.

2. The method according to claim 1, wherein the step of detecting that the mobile terminal satisfies the preset DRX parameter modification condition comprises:
   determining that the mobile terminal satisfies the preset DRX parameter modification condition, if it is detected that remaining battery capacity of the mobile terminal is lower than a preset battery capacity; or determining that the mobile terminal satisfies the preset DRX parameter modification condition, if it is detected that an occupancy rate of a central processing unit of the mobile terminal is higher than or equal to a preset occupancy rate; or determining that the mobile terminal satisfies the preset DRX parameter modification condition, if it is detected that a temperature of the mobile terminal is higher than or equal to a preset temperature.

3. The method according to claim 1, wherein a first mapping relationship table is preset in the mobile terminal, the first mapping relationship table comprises multiple pieces of service information of the mobile terminal, DRX parameter values corresponding to the respective pieces of the service information, and priority information corresponding to the respective pieces of the service information;

the step of transmitting the DRX parameter modification request message to the base station comprises:

determining a DRX parameter value corresponding to service information with a highest priority in the first mapping relationship table as a DRX parameter target value; and transmitting a DRX parameter modification request message carrying the DRX parameter target value to the base station.

4. The method according to claim 3, wherein the step of transmitting the DRX parameter modification request message carrying the DRX parameter target value to the base station comprises:

transmitting the DRX parameter modification request message carrying the DRX parameter target value to the base station via high layer signaling.

5. The method according to claim 3, wherein the first mapping relationship table further comprises logical channel identifier (LCID) values corresponding to the respective DRX parameter values, the step of transmitting the DRX parameter modification request message carrying the DRX parameter target value to the base station comprises:

querying the first mapping relationship table according to the DRX parameter target value, and acquiring a LCID value corresponding to the DRX parameter target value; and transmitting the acquired LCID value via a high layer control element, and transmitting the DRX parameter modification request message which carries the DRX parameter target value to the base station.

6. The method according to claim 1, wherein the step of receiving the response message transmitted from the base station which comprises the first instruction indicating that the DRX parameter updating of the mobile terminal is confirmed comprises:

receiving, via the high layer signaling, the response message transmitted from the base station which comprises the first instruction; or receiving the response message transmitted from the base station which comprises the first instruction identified by a LCID value transmitted in a high layer control element.

7. The method according to claim 1, wherein the step of receiving the response message transmitted from the base station which comprises the second instruction indicating that the DRX parameter updating of the mobile terminal is denied comprises:

receiving, via the high layer signaling, the response message transmitted from the base station which comprises the second instruction; or receiving the response message transmitted from the base station which comprises the second instruction identified by a LCID value transmitted in a high layer control element.

8. The method according to claim 3, wherein the step of updating a DRX parameter configuration by the mobile terminal according to the response message comprises:

updating a DRX parameter according to the DRX parameter target value, if the response message comprises a first instruction indicating that the DRX parameter updating of the mobile terminal is confirmed;

controlling the mobile terminal not to perform the DRX parameter updating and continuing to transmit the DRX parameter modification request message to the base station after a preset time, if the response message comprises a second instruction indicating that the DRX parameter updating of the mobile terminal is denied and a third instruction for indicating the mobile terminal to continue to transmit the DRX parameter modification request message after a preset time.

9. A configuration method of DRX parameter applied to a base station, comprising:

receiving a DRX parameter modification request message transmitted from a mobile terminal;

transmitting a response message to the mobile terminal to make the mobile terminal update a DRX parameter configuration;

wherein a fourth mapping relationship table is preset in the base station, the fourth mapping relationship table comprises multiple instructions corresponding to the response message and LCID values corresponding to the respective instructions, the multiple instructions comprises:

a first instruction indicating that the DRX parameter updating of the mobile terminal is confirmed; a second instruction indicating that the DRX parameter updating of the mobile terminal is denied; and a third instruction for indicating the mobile terminal to continue to transmit the DRX parameter modification request message after a preset time;

wherein the step of transmitting the response message to the mobile terminal comprises:

determining at least one service among the services carried by the mobile terminal by whether the remaining time is less than a predetermining time;

if there is not a service with the remaining time less than the predetermining time in the services carried by the mobile terminal, transmitting a response message comprising the first instruction to the mobile terminal;

if there is at least one service with the remaining time less than the predetermining time in the services carried by the mobile terminal, transmitting a response message comprising the second instruction to the mobile terminal;

wherein the step of transmitting the response message comprising the first instruction to the mobile terminal comprises:

transmitting the response message comprising the first instruction to the mobile terminal via high layer signaling; or transmitting the response message comprising the first instruction to the mobile terminal by transmitting a LCID value corresponding to the first instruction to the mobile terminal via a high layer control element;

wherein, the step of transmitting the response message comprising the second instruction to the mobile terminal comprises:

transmitting the response message comprising the second instruction to the mobile terminal via high layer signaling; or transmitting the response message comprising the second instruction to the mobile terminal by transmitting a LCID value corresponding to the second instruction to the mobile terminal via a high layer control element.

10. The method according to claim 9, wherein the step of receiving the DRX parameter modification request message transmitted from the mobile terminal comprises:

receiving a DRX parameter modification request message carrying a DRX parameter target value transmitted from the mobile terminal.

11. The method according to claim 10, wherein a third mapping relationship table is preset in the base station, the third mapping relationship table comprises multiple DRX parameter target values and LCD values corresponding to the respective DRX parameter target values, the step of receiving the DRX parameter modification request message carrying the DRX parameter target value transmitted from the mobile terminal comprises:

receiving, via high layer signaling, the DRX parameter modification request message carrying the DRX parameter target value transmitted from the mobile terminal; or receiving a DRX parameter modification request message carrying a DRX parameter target value transmitted from the mobile terminal identified by a LCD value transmitted in a high layer control element.

12. The method according to claim 9, further comprises:
if there is a service with the remaining time less than the predetermining time in the services carried by the mobile terminal, transmitting a response message comprising the second instruction and the third instruction to the mobile terminal.

13. A mobile terminal, comprising a storage, a processor, and a computer program stored on the storage and executable by a processor, the steps of the configuration method of DRX parameter applied to a mobile terminal according to claim 1 are implemented when the computer program is executed by the processor.

14. A base station, comprising a storage, a processor, and a computer program stored on the storage and executable by a processor, the steps of the configuration method of DRX parameter applied to a base station according to claim 9 are implemented when the computer program is executed by the processor.

* * * * *